United States Patent
Kanza et al.

(10) Patent No.: US 12,549,521 B2
(45) Date of Patent: Feb. 10, 2026

(54) LOCALIZED ACCESS CONTROL FOR PRIVATE NETWORKS

(71) Applicant: AT&T Intellectual Property I, L.P., Atlanta, GA (US)

(72) Inventors: Yaron Kanza, Fair Lawn, NJ (US); Raghvendra Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 292 days.

(21) Appl. No.: 17/934,545

(22) Filed: Sep. 22, 2022

(65) Prior Publication Data
US 2024/0106800 A1    Mar. 28, 2024

(51) Int. Cl.
*H04L 9/40*    (2022.01)

(52) U.S. Cl.
CPC ........ *H04L 63/0272* (2013.01); *H04L 63/102* (2013.01)

(58) Field of Classification Search
CPC .. H04L 63/0272; H04L 63/102; H04L 63/107
See application file for complete search history.

(56) References Cited

U.S. PATENT DOCUMENTS

| | | | |
|---|---|---|---|
| 2009/0022127 A1* | 1/2009 | Traynor | G01S 5/02 370/338 |
| 2010/0205316 A1* | 8/2010 | Xue | H04L 63/062 709/229 |
| 2017/0251365 A1* | 8/2017 | Burchardt | H04L 63/107 |
| 2021/0144150 A1* | 5/2021 | James | H04N 21/43637 |

\* cited by examiner

*Primary Examiner* — Olugbenga O Idowu

(57) ABSTRACT

In one example, the present disclosure describes a device, computer-readable medium, and method for managing access control in private networks like home or corporate networks based on a current location such as a defined area, e.g., a room, in which a network-connected device is located. For instance, in one example, a method performed by a processing system including at least one processor includes receiving a request from a user endpoint device to access a private network that provides a network connectivity within a structure, determining a current location of the user endpoint device within the structure, determining whether an access control rule permits access to the private network for a combination of the user endpoint device and the current location of the user endpoint device, and taking, in response to the determining, an action to enforce the access control rule.

20 Claims, 4 Drawing Sheets

LOCALIZED ACCESS CONTROL FOR PRIVATE NETWORKS

The present disclosure relates generally to network access control, and relates more particularly to devices, non-transitory computer-readable media, and methods for managing access control in private networks like home or corporate networks based on the area, e.g., a room, in which a network-connected device is located.

BACKGROUND

Network access control is a security feature that restricts unauthorized users and devices from gaining access to a private network (e.g., a home or corporate network). In other words, network access control settings allow authorized users and devices to connect to a private network, while unauthorized users and devices are prevented from connecting.

SUMMARY

In one example, the present disclosure describes a device, computer-readable medium, and method for managing access control in private networks like home or corporate networks based on a current location such as a defined area, e.g., a room, in which a network-connected device is located. For instance, in one example, a method performed by a processing system including at least one processor includes receiving a request from a user endpoint device to access a private network that provides a network connectivity within a structure, determining a current location of the user endpoint device within the structure, determining whether an access control rule permits access to the private network for a combination of the user endpoint device and the current location of the user endpoint device, and taking, in response to the determining, an action to enforce the access control rule.

In another example, a non-transitory computer-readable medium stores instructions which, when executed by a processing system including at least one processor, cause the processing system to perform operations. The operations include receiving a request from a user endpoint device to access a private network that provides a network connectivity within a structure, determining a current location of the user endpoint device within the structure, determining whether an access control rule permits access to the private network for a combination of the user endpoint device and the current location of the user endpoint device, and taking, in response to the determining, an action to enforce the access control rule.

In another example, a system includes a processing system including at least one processor and a non-transitory computer-readable medium storing instructions which, when executed by the processing system, cause the processing system to perform operations. The operations include receiving a request from a user endpoint device to access a private network that provides a network connectivity within a structure, determining a current location of the user endpoint device within the structure, determining whether an access control rule permits access to the private network for a combination of the user endpoint device and the current location of the user endpoint device, and taking, in response to the determining, an action to enforce the access control rule.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a system, method, and non-transitory computer readable medium for managing access control in private networks like home or corporate networks based on a defined area, e.g., a room, in which a network-connected device is located. As discussed above, network access control is a security feature that restricts unauthorized users and devices from gaining access to a private network (e.g., a home or corporate network). In other words, network access control settings allow authorized users and devices to connect to a private network, while unauthorized users and devices are prevented from connecting.

In many private networks, access control is based on the device or the domain. For instance, a school may restrict access to the World Wide Web such that student devices connected to the school's private network can access only approved domains (e.g., domains that are included in a predefined whitelist, such as domains for educational web sites). In a home network, parents may block access by their child's devices to web sites that the parents consider inappropriate for the child. In an enterprise network, an employer may block access by employee computing devices to social network sites or other web sites that are considered to be unsecure.

Examples of the present disclosure provide network access control at a more granular level. For instance, in one example, network access control rules may be defined for individual rooms or locations within a structure (e.g., a home, a school, or an office building) that is served by a private network, thereby allowing more finely tuned control over the manner in which devices access the private network. For instance, a parent may prevent any devices from accessing the home network from their child's bedroom after 9:00 PM, or a person who works from home may prevent any devices from accessing work-related material over the home network from rooms in their home other than their home office. In one example, a local router such as a residential gateway may identify the room or location within a structure from which a device is attempting to connect to a private network that serves the structure. The local router may then manage network traffic to and from the device based on traffic control rules that use features such as: (1) the room or location within the structure; (2) the device; and/or (3) the time of day. These and other aspects of the present disclosure are discussed in further detail with reference to FIGS. 1-5, below.

Figure 1:
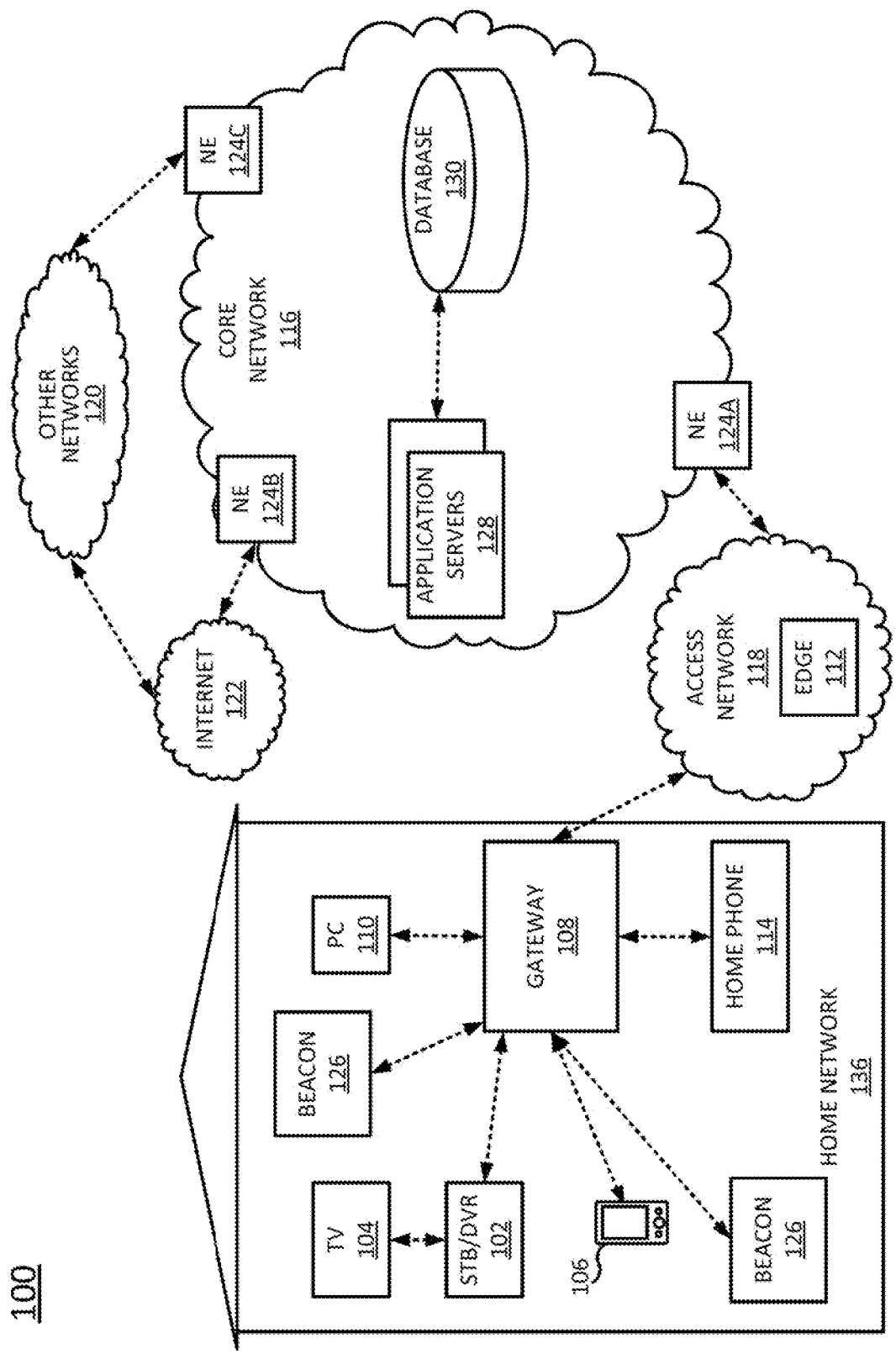
FIG. 1 illustrates an example system related to the present disclosure.

To better understand the present disclosure, FIG. 1 illustrates an example system 100 related to the present disclosure. As shown in FIG. 1, the system 100 may comprise a network 116, e.g., a telecommunication service provider network, a core network, or an enterprise network comprising infrastructure for computing and communications services of a business, an educational institution, a governmental service, or other enterprises. The network 116 may be in communication with one or more access networks (e.g., access network 118), other networks 120, and the Internet 122. In one example, network 116 may combine core network components of a cellular network with components of a triple play service network; where triple-play services include telephone services, Internet or data services and television services to subscribers. For example, network 116 may functionally comprise a fixed mobile convergence (FMC) network, e.g., an IP Multimedia Subsystem (IMS) network. In addition, network 116 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 116 may further comprise a broadcast television network, e.g., a traditional cable provider network or an internet Protocol Television (IPTV) network, as well as an Internet Service Provider (ISP) network. In one example, network 116 may include a plurality of television (TV) servers (e.g., a broadcast server, a cable head-end), a plurality of content servers, an advertising server (AS), an interactive TV/video on demand (VoD) server, and so forth.

In one example, the access network 118 may comprise a broadband optical and/or cable access network, a Local Area Network (LAN), a wireless access network (e.g., an IEEE 802.11/Wi-Fi network and the like), a cellular access network, a Digital Subscriber Line (DSL) network, a public switched telephone network (PSTN) access network, a 3$^{rd}$ party network, and the like. For example, the operator of network 116 may provide a cable television service, an IPTV service, or any other types of telecommunication service to subscribers via access network 118. In one example, the network 116 may be operated by a telecommunication network service provider. The network 116 and the access network 118 may be operated by different service providers, the same service provider or a combination thereof, or may be operated by entities having core businesses that are not related to telecommunications services, e.g., corporate, governmental or educational institution LANs, and the like. As shown in FIG. 1, the network 116 may also include a plurality of application servers 128 and a database 130. For ease of illustration, various additional elements of core network 116 are omitted from FIG. 1.

In accordance with the present disclosure, network 116 may include a plurality of application servers (AS) 128, each of which may comprise a computing system or server, such as computing system 500 depicted in FIG. 5, and may be configured to provide services to devices in a home network 136, as discussed in further detail below. The network 116 may also include at least one database (DB) 130 that is communicatively coupled to the AS 128. For instance, an AS 128 may provide a streaming media service, such as a streaming video service, and the DB 130 may store video content that can be accessed via the streaming video service. Alternatively, an AS 128 may provide an immersive gaming service, and the DB 130 may store interactive game objects that can be rendered by the immersive gaming service.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure. Thus, it should be noted that any number of servers and any number of databases may be deployed in the network 116. Furthermore, these servers and databases may operate in a distributed and/or coordinated manner as a processing system to perform operations in connection with the present disclosure.

Figure 5:
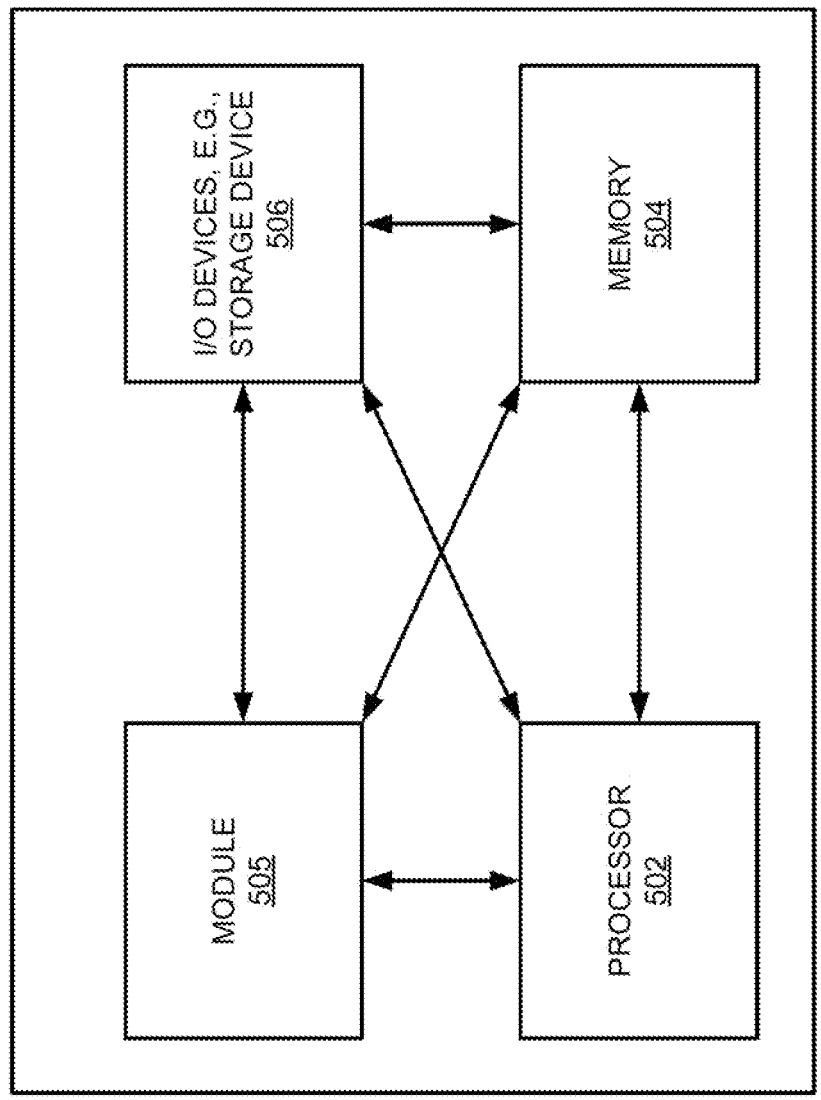
FIG. 5 depicts a high-level block diagram of a computing device specifically programmed to perform the functions described herein.

In one example, access network 118 may include an edge server 112, which may comprise a computing system or server, such as computing system 500 depicted in FIG. 5, and may be configured to provide any of the services provided by any of the application servers 128.

In one example, any of the application servers 128 may comprise a network function virtualization infrastructure (NFVI), e.g., one or more devices or servers that are available as host devices to host virtual machines (VMs), containers, or the like comprising virtual network functions (VNFs). In other words, at least a portion of the network 116 may incorporate software-defined network (SDN) components. Similarly, in one example, access network 118 may comprise an "edge cloud," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 118 comprises a radio access network, the nodes and other components of the access network 118 may be referred to as a mobile edge infrastructure. As just one example, edge server 112 may be instantiated on one or more servers hosting virtualization platforms for managing one or more virtual machines (VMs), containers, microservices, or the like. In other words, in one example, edge server 112 may comprise a VM, a container, or the like.

In one example, home network 136 may include a gateway device 108 (e.g., a residential gateway), which receives streams of data associated with different types of media, e.g., television, phone, and Internet, and separates these communications for the appropriate digital devices to which the gateway device 108 is connected. The streams of data may be received via access network 118, for instance. In one example, television data files are forwarded to a smart television (TV) 104 to be decoded, recorded, and/or displayed. Similarly, Internet communications are sent to and received from gateway device 108, which may be capable of both wired and/or wireless communication. In turn, gateway device 108 receives streams of data from and sends the streams of data to the appropriate devices, e.g., mobile phone 106, personal computer (PC) 110, home phone 114, and/or other devices. Each of these devices may be configured to support media content of particular file formats. TV 104 may also be configured to support media content of particular file formats. In one example, gateway device 108 may comprise a wired Ethernet router and/or an Institute for Electrical and Electronics Engineers (IEEE) 802.11 (Wi-Fi) router, and may communicate with respective devices in home network 136 via wired and/or wireless connections.

In one example, the home network 136 may further include a plurality of beacons 126. The plurality of beacons 126 may be distributed throughout the home network 136 in a plurality of fixed locations, for instance in different rooms or locations within the home. For example, one beacon 126 may be located in a living room of the home, another beacon 126 may be located in a home office of the home, another beacon 126 may be located in a child's bedroom in the home, and so on. In one example, each beacon 126 may have at least two transmitters: a first, short-range transmitter for communicating with user endpoint devices within range of the first transmitter (e.g., TV 104, mobile phone 106, PC 110, home phone 114, and/or other devices) and a second, longer range transmitter for communicating with the gateway device 108. For instance, the first transmitter may be a Bluetooth transmitter, while the second transmitter may be a WiFi transmitter. In another example, the beacon 126 may be connected via a physical network connection to the gateway device 108, in which case the longer-range transmitter may not be necessary. Because each beacon 126 is fixed to at its respective location, each beacon 126 can be used to uniquely identify a specific location within the home network. Moreover, the first, short range transmitter ensures that a beacon 126 can only be accessed by user endpoint devices in the same room or location as (i.e., within detection range of) the beacon 126. It is noted that larger rooms or locations may utilize more than one beacon 126.

In one example, the beacons 126 and the gateway device 108 may be configured to perform functions in connection with examples of the present disclosure for managing access control in the home network 136 based on the room in which a network-connected device (e.g., TV 104, mobile phone 106, PC 110, home phone 114, and/or other devices) is located. For instance, as discussed above, when a network-connected device enters a location, such as a room within a home, the network-connected device may connect to a beacon 126 that is located in that location (e.g., via Bluetooth™ or another short-range communication protocol). Once the network-connected device and the beacon 126 have established a connection, the beacon 126 may (at least temporarily) associate the location with the network-connected device.

In one example, the beacon 126 may associate the location with the network-connected device by first extracting an identifier of the network-connected device, such as the network-connected device's media access control (MAC) address. If the Internet Protocol (IP) device of the network-connected device is fixed in the private network and does not change over time, then the beacon may associate the location with the network-connected device's IP address. However, in many home networks the IP address may be assigned dynamically, so MAC address may be a more consistent device identifier. Then, the beacon 126 may send the identifier of the network-connected device to the gateway device 108. In one example, the beacon 126 sends the identifier of the network-connected device to the gateway device 108 via a secure connection, such as using secure sockets layer (SSL) or transport layer security (TLS).

The gateway device 108 may store a table or other data structures that indicate, for each beacon 126, the fixed location or coordinates of the beacon. Thus, when the gateway device receives a network-connected device's identifier from a particular beacon 126, the gateway device 108 may be able to determine the location of the network-connected device (i.e., as the location of the particular beacon 126 from which the network-connected device's identifier was received). In one example, the beacon 126 may periodically (e.g., every x seconds) attempt to connect to the network-connected device in order to confirm the network-connected device's continued presence in the location (e.g., if the beacon 126 can no longer establish a connection to the network-connected device, this may indicate that the network-connected device has moved to a new location outside of the detection range of the beacon 126).

In another example, the beacon 126 may periodically (e.g., every y seconds) generate a token (e.g., a large random number). The beacon 126 may send the token to the gateway device 108 in a secure manner, such as using SSL or TLS. Then, when a network-connected device wants to access the home network 136 from the location associated with the beacon 126, the network-connected device may request the token from the beacon. Subsequently, the network-connected device may provide the token to the gateway device while attempting to connect to the home network 136; if the token provided by the network-connected device matches a token provided by a beacon 126, this match may serve as proof that the network-connected device is currently located in the location associated with the beacon 126.

In some examples, a beacon 126 may generate a token specifically for a request received from a network-connected device (e.g., rather than automatically generating periodic tokens that are not request specific). The token in this case may be associated with the MAC address (or another identifier) of the network-connected device. Generating request-specific tokens may be more secure, but may also be more costly.

In further examples, rather than generating tokens, a beacon 126 may generate an encryption key when a network-connected device requests access to the home network 136 (e.g., using data encryption standard (DES) or advanced encryption standard (AES)). In this case, the beacon 126 will share the encryption key with both the network-connected device and the gateway device 108. Then, the network-connected device may use the encryption key to encrypt its request to access the home network 136. The gateway device 108 may use the encryption key to decrypt the message; a successfully decrypted request may indicate that the network-connected device is currently located in the location of the beacon 126 from which the encryption key was received. Using encryption keys instead of tokens may provide a more secure way of verifying location (which may not be needed in a private network that serves a home, but may be more useful in a private network that serves a school or business where leaks of sensitive information may be a risk).

Having the beacon 126 send the identifier of the network-connected device to the gateway device 108 may provide stronger security than having the network-connected device provide the token or encrypted request to the gateway device 108. However, requiring the beacon 126 and the gateway device 108 to frequently exchange data may be less desirable since this approach may generate more network traffic.

Once the location of a network-connected device has been established, the gateway device 108 may be further configured to apply access control rules to the network-connected device's requests to access the home network 136. The access control rules may specify one or more criteria under which a network-connected device is permitted or not permitted to access the home network 136. More specifically, the gateway device 108 may operate in an "allow-as-default" mode or a "deny-as-default" mode. In allow-as-default mode, the gateway device 108 may allow access to the home network 136 unless certain criteria of a requested access match a rule that denies access. In deny-as-default mode, the gateway device 108 may deny access to the home network 136 unless certain criteria of a requested access match a rule that permits access. The criteria may include one or more of: the identity of the network-connected device, the current location of the network-connected device, the time of day, and the resource or service that the network-connected device is attempting to access via the home network 136.

For example, suppose that two rules are defined in allow-as-default mode: (1) deny(00.00A.BB.28.FC, bedroom_1, 21:00-7:00) and (2) deny(00.00.0A.BB.20.FA, bedroom_2, *). In this case, the gateway device 108 would deny access to the home network 136 for device 00.00A.BB.28.FC from Bedroom 1 between the times of 9:00 PM and 7:00 AM and would deny access to the home network 136 for device 00.00.0A.BB.20.FA from Bedroom 2 at all times.

Suppose, on the other hand, that three rules are defined in deny-as-default mode: (1) allow(00.00A.BB.28.FC, bedroom_1, *); (2) allow(00.00.0A.BB.20.FA, *, 7:00-19:30); and (3) allow(00.00.0B.CC.15.FA, bedroom_2, 7:00-17:00). In this case, the gateway device 108 would grant access to the home network 136 for 00.00A.BB.28.FC at any time, but only from Bedroom 1; would grant access to the home network 136 for the device 00.00.0A.BB.20.FA from any room, but only between the hours of 7:00 AM and 7:30 PM; and would grant access to the home network 136 for the device 00.00.0B.CC.15.FA only from Bedroom 2 and only between the hours of 7:00 AM and 5:00 PM.

Access control rules may also be extended to restrict the resources or services that can be accessed. For example, the rule deny(*, bedroom_1, * socialnetworkABC.com) would control the gateway device 108 to deny access to the domain for Social Network ABC from Bedroom 1 at all times and for all devices. Similarly, the rule allow (00.00.0A.BB.20.FA, livingroom, 17:00-19:00, streaming-serviceXYZ.com) would control the gateway device 108 to allow access to the domain for Streaming Service XYZ only in the living room, only using device 00.00.0A.BB.20.FA, and only between the hours of 5:00 PM and 7:00 PM.

In further examples still, access control rules could limit data upload, e.g., allowing a device to download data but restricting upload of data by the device from a specified location and during specified time periods.

A set of access control rules configured on the gateway device 108 may collectively define an access control policy for the home network 136. The access control policy may be changed by adding or deleting access control rules. Access control rules may be added or deleted using any designated device (e.g., mobile phone 106, personal computer (PC) 110, home phone 114, and/or other devices) or by initiating access control rules with the device(s) affected by the access control rules in the location(s) where the access control rules are to be applied. For example, if a user wishes to deny access for a device with a MAC address of "m" from room "r," the user could take the device to room r, access the gateway device 108 (e.g., via a web browser) and request that access permissions for the device be revoked for the room r, possibly for a specified range of time and/or for specified resources or services (e.g., domains or web sites). The gateway device 108 may then automatically identify the MAC address m of the device and the room r, so that even a novice user could define access control rules without having to perform technical operations such as looking up the device's MAC address.

For more technically knowledgable users, access control rules could be configured through a software application on a user's mobile device or through a web portal. In this case, a declarative approach may allow the user to specify the user endpoint devices that they wish to block or restrict access for, the times of day at which access is to be blocked or restricted, the locations (e.g., rooms) from which access is to be blocked or restricted, and the resources or services that are to be blocked or restricted.

In another example, machine learning could be used by the gateway device 108 to automatically learn access control rules. For instance, whenever network access by a specific user endpoint device should be blocked in a specific room, a user who has permission to define an access control policy may label the event (which may be defined by a tuple of: device, room, and time) as a "block access" case. The gateway device 108 will collect labeled events and use the labeled events to train a machine learning model that will create access control rules. The machine learning model may cluster events that are labeled as "block access" (i.e., events that have been labeled by a permitted user based on the times and locations of the events) over a multi-dimensional array (e.g., location, time, device, resource or service), and each cluster may yield a rule. For instance, if the cluster refers to a time interval [t1, t2], to devices d1 and d2, and to a room r, then the resulting rule may specify that network access by devices d1 and d2 in the room r should be blocked for the time of day defined by the interval [t1, t2].

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 116 is not limited to an IMS network. Similarly, the present disclosure is not limited to an IP/MPLS network for VoIP telephony services, or any particular type of broadcast television network for providing television services, and so forth.

Figure 2:
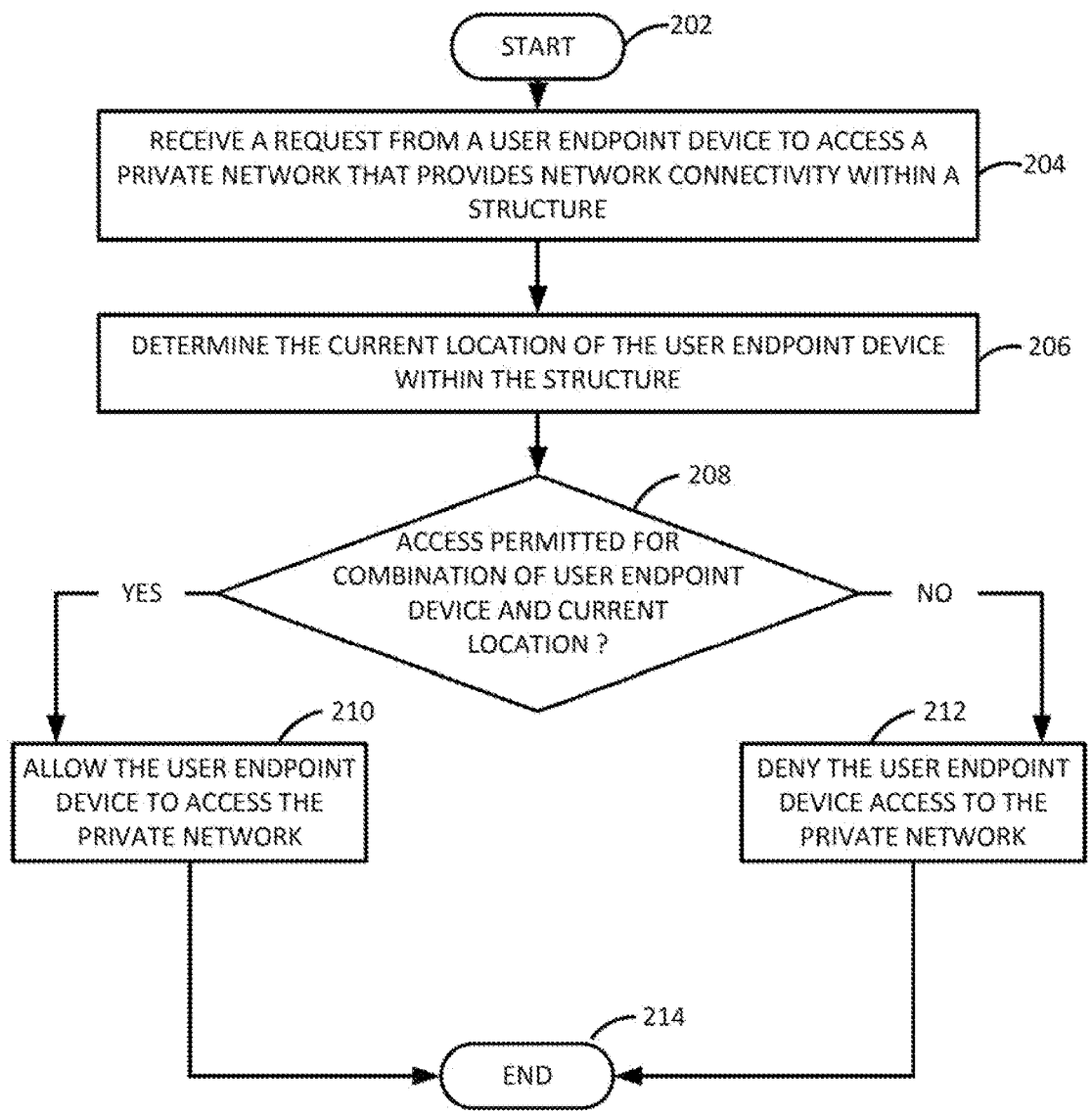
FIG. 2 illustrates a flowchart of an example method for managing access control in a private network based on the room in which a network-connected device is located.

To further aid in understanding the present disclosure, FIG. 2 illustrates a flowchart of an example method 200 for managing access control in a private network based on the room in which a network-connected device is located. In one example, the method 200 may be performed by the gateway device 108 illustrated in FIG. 1. However, in other examples, the method 200 may be performed by another device, such as the computing system 500 of FIG. 5, discussed in further detail below. For the sake of discussion, the method 200 is described below as being performed by a processing system (where the processing system may comprise a component of the gateway device 108, the computing system 500, or another device).

The method 200 begins in step 202. In step 204, the processing system may receive a request from a user endpoint device to access a private network that provides network connectivity within a structure.

Within the context of the present disclosure, a "structure" may be understood to refer to a building that includes a plurality of discrete locations or defined areas. For instance, a structure could comprise a home that includes multiple rooms (e.g., a living room, a kitchen, one or more bedrooms, etc.), an office building that includes multiple floors and/or rooms (e.g., a conference room, a kitchen, a lobby, one or more offices or cubicles, etc., which may be divided among one or more businesses), a school that includes multiple buildings and/or rooms (e.g., an office, a cafeteria, a gymnasium, a library, one or more classrooms, etc.), or any other types of structure within which two or more locations can be differentiated from each other.

In one example, the user endpoint device may comprise a mobile device that is capable of moving among a plurality of locations, such as a smart phone, a tablet computer, a laptop computer, a portable gaming system, a wearable device (e.g., a smart watch, a head mounted display, a fitness tracker, or the like), or the like. However, in further examples, the user endpoint device may comprise any other types of computing devices, including a computing device whose location is relatively fixed, such as a desktop computer, a smart television, an Internet of Things (IoT) device, a gaming console, or the like.

In one example, the request to access the private network may comprise a request to connect the user endpoint device to the private network. In another example, the user endpoint device may already be connected to the private network, and the request may comprise a request to access a particular resource or service (e.g., a web site, a streaming media service, a virtual assistant, a mobile application, or the like) via the private network.

In step 206, the processing system may determine a current location of the user endpoint device within the structure (i.e., the location from which the user endpoint device is making the request to access the private network).

In one example, the current location may comprise the specific room of the structure from which the user endpoint device made the request to access the private network. For instance, the processing system may determine that the user endpoint device is currently located in a child's bedroom in a home, in a specific classroom in a school building, in a specific office suite of a multi-business office building, or the like.

In one example, the processing system may determine the current location of the user endpoint device by receiving a message from a beacon that is also located in the current location of the user endpoint device. For instance, as discussed above, in some examples a plurality of beacons may be distributed throughout the structure. When the user endpoint device enters the detection range of one of these beacons (e.g., by entering a room in which the beacon is located), the beacon may identify the user endpoint device (e.g., by MAC address or other identifiers) and send the identity of the user endpoint device to the processing system, along with an identifier of the beacon and/or an identifier of the location. The beacon may periodically initiate a connection to the user endpoint device in order to confirm that the user endpoint device is still within the beacon's detection range. Thus, the processing system may identify the last beacon from which a message was received that included an identifier matching the user endpoint device, and may assume that the location associated with the last beacon is the current (or at least last known) location of the user endpoint device.

In another example, the processing system may determine the current location of the user endpoint device by retrieving a token from the request to access the private network. For instance, as discussed above, in some examples, each beacon of the plurality of beacons may periodically generate a token (e.g., a large random number) that the beacon sends to the processing system in a secure manner. When a user endpoint device tries to access the private network from the location associated with the beacon, the user endpoint device must first obtain the token from the beacon and then include the token in the request sent to the processing system. Thus, the processing system may determine whether the request to access the private network includes a valid token, and, if so, which location in the structure the token is associated with. The location associated with the valid token may be assumed to be the current location of the user endpoint device. As discussed above, in some examples, a beacon may generate a new token, and send that new token to the processing system, each time a user endpoint device requests access to the private network from within the location associated with the beacon. Thus, individual tokens may be unique to requests rather than unique to locations within the structure.

In another example, the beacons may generate encryption keys instead of tokens. In this case, encryption keys may be unique to a communication session between the user endpoint device and the processing system and may be shared by the beacon with both the user endpoint device and the processing system. The encryption key will allow the user endpoint device to encrypt the request for access to the private network as well as allow the processing system to decrypt the request.

In step 208, the processing system may determine whether an access control rule permits access to the private network for the combination of the user endpoint device and the current location of the user endpoint device.

As discussed above, an access control rule may be defined for the private network that controls access to the private network based on: (1) the user endpoint device requesting the access; and (2) the location within the structure from which the user endpoint device is requesting the access. In further examples, the access control may be further based on: (3) the time of day at which the access is requested; and/or (4) the resource or service associated with the request for access (e.g., a web site or mobile application that the user endpoint device is trying to connect to via the private network).

As discussed above, in an allow-as-default mode, the processing system may determine that the requested access to the private network is permitted as long as there is no access control rule forbidding access to the private network for the combination of user endpoint device and current location of the user endpoint device (and, optionally, time of day and/or resource or service requested, as well). For instance, in allow-as-default mode, a rule may specify that a child's tablet computer cannot access the home network from the child's bedroom after 9:00 PM or cannot access social media web sites from the child's bedroom at any time. Thus, as long as the requested access to the private network does not match a rule specifying an access that is forbidden, the processing system may determine that the requested access to the private network is permitted.

In a deny-as-default mode, the processing system may determine that the request access to the private network is permitted only if there is an access control rule that expressly permits the access to the private network for the combination of user endpoint device and current location of the user endpoint device (and, optionally, time of day and/or resource or service requested, as well). For instance, in deny-as-default mode, a rule may specify that a student's laptop computer is allowed to access a math learning web site from a classroom of a school. Thus, as long as the requested access to the private network matches a rule specifying an access that is permitted, the processing system may determine that the requested access to the private network is permitted.

If the processing system determines in step 208 that an access control rule permits access to the private network for the combination of the user endpoint device and the current location of the user endpoint device, then the method 200 may proceed to step 210. In step 210, the processing system may allow the user endpoint device to access the private network.

That is, the user endpoint device may be permitted to access a resource or service via the private network. In one example, the permission to access the resource or service may last only for as long as the user endpoint device remains in the current location (and/or the current time remains within a predefined time range and/or the user endpoint device remains connected to a permitted resource or service). For instance, if the user endpoint device moves location, such as moving from one room in a house to another room in the house, the user endpoint device may have to request access from the processing system all over again (and the processing system may have to validate that requested access against any applicable access control rules for the new location).

If, on the other hand, the processing system determines in step 208 that an access control rule does not permit access to the private network for the combination of the user endpoint device and the current location of the user endpoint device, then the method 200 may proceed to step 212. In step 212, the processing system may deny the user endpoint device access to the private network.

In one example, the processing system may send a message to the user endpoint device specifying the reason why the requested access was denied (e.g., this device is not permitted to access the network from the child's bedroom), so that the user of the user endpoint device may try resubmitting the request (e.g., from another room within the home, such as the living room).

Once the processing system has either allowed or denied the requested access in step 210 or step 212, respectively, the method 200 may end in step 214.

However, it will be appreciated that the method 200, or steps of the method 200, may be repeated as the user endpoint device may move to different locations within the structure. For instance, a user may be using their mobile device within his or her home and may move from the living room to the bedroom and back to the living room. Similarly, a user may be using his or her mobile device in a school courtyard before moving inside to a classroom for a class. Thus, as the user endpoint devices moves between locations within the structure, the user endpoint device may need to re-request access to the private network, and the processing system may need to evaluate each request against the relevant access control rules.

Moreover, as discussed above, an access control rule may specify one or more criteria in addition to user endpoint device and location. For instance, access may also be restricted based on time of day and/or resource or service requested. As an example, a child may be permitted to use his or her smart phone in his or her bedroom until 9:00 PM, at which time the child is no longer permitted to use the smart phone in the bedroom. Similarly, a student may be permitted to access predefined educational web sites from a laptop computer while in a classroom, but may not be permitted to access any other web sites while in the classroom. Thus, the processing system may need to re-evaluate the user endpoint device's permission to access the private network as these other criteria change (e.g., the time changes or the user endpoint device attempts to access a new web site).

Figure 3:
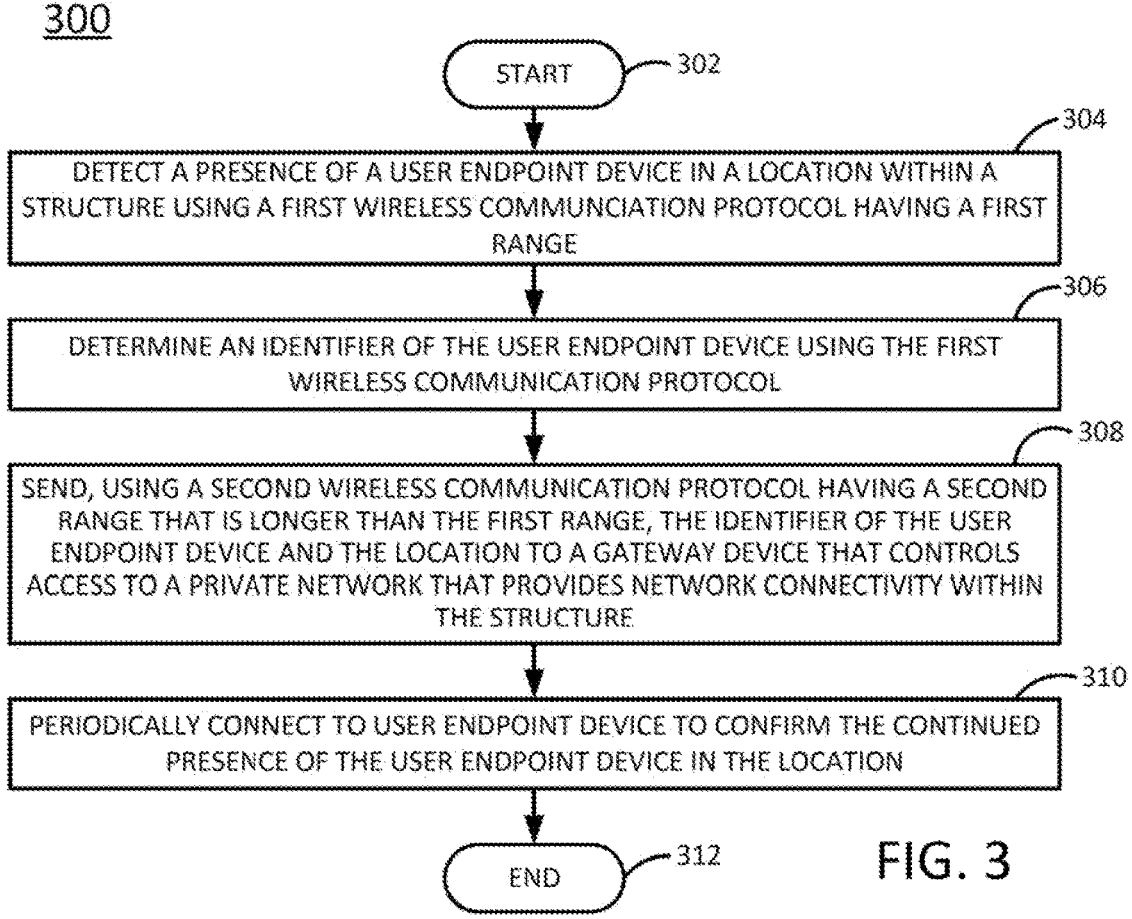
FIG. 3 illustrates a flowchart of an example method for managing access control in a private network based on the room in which a network-connected device is located.

FIG. 3 illustrates a flowchart of an example method 300 for managing access control in a private network based on the room in which a network-connected device is located. In one example, the method 300 may be performed by a beacon, such as one of the beacons 126 illustrated in FIG. 1. However, in other examples, the method 300 may be performed by another device, such as the computing system 500 of FIG. 5, discussed in further detail below. For the sake of discussion, the method 300 is described below as being performed by a processing system (where the processing system may comprise a component of a beacon, the computing system 500, or another device).

The method 300 begins in step 302. In step 304, the processing system may detect the presence of a user endpoint device in a location within a structure using a first wireless communication protocol having a first range.

For instance, in one example, the processing system may be part of a beacon whose position is fixed in the location. The processing system may be in communication with a first wireless transmitter of the beacon that utilizes the first wireless communication protocol to detect the presence of and to exchange data with user endpoint devices that are also present in the location (e.g., are at least within a detection range of the first wireless transmitter). The first wireless communication protocol may be a short-range wireless communication protocol, such as Bluetooth™.

In step 306, the processing system may determine an identifier of the user endpoint device, using the first wireless communication protocol. For instance, the processing system may query the user endpoint device for the identifier. In one example, the identifier may be a MAC address of the user endpoint device, an IP address of the user endpoint device, or another identifier that can uniquely identify the user endpoint device.

In step 308, the processing system may send, using a second wireless communication protocol having a second range that is longer than the first range (or securely through a wire, if there is a physical network connection between the processing system and the gateway device), the identifier of the user endpoint device and its location to a gateway device that controls access to a private network that provides network connectivity within the structure.

In one example, the second wireless communication protocol is a wireless communication protocol that has a longer range than the first wireless communication protocol. For instance, if the first wireless communication protocol is Bluetooth™, the second wireless communication protocol may be WiFi.

The gateway device may be a router, a residential gateway, or another device that controls access to the private network by user endpoint devices. For instance, the gateway device may apply an access control rule to the identifier of the user endpoint device and the location (and, optionally, to the current time of day and to any specific resource or service that the user endpoint device is attempting to access via the private network) in order to determine whether the user endpoint device should be permitted to access the private network or be blocked from accessing the private network.

In step 310, the processing system may periodically connect to the user endpoint device, using the first wireless communication protocol, to confirm the continued presence of the user endpoint device in the location.

For instance, the processing system may periodically (e.g., every x seconds) initiate a connection with the user endpoint device. The connection may comprise a repeated query for the identifier of the user endpoint device, a simply query to confirm presence, or any other types of query that requires a response from the user endpoint device. If the processing system receives a response to the query, then the processing system may assume that user endpoint device is still within the detection range of the first wireless transmitter and is, therefore, still in the location. If the processing system does not receive a response to the query, then the processing system may assume that user endpoint device is no longer within the detection range of the first wireless transmitter and is, therefore, no longer in the location.

In step 312, the method 300 may end.

Figure 4:
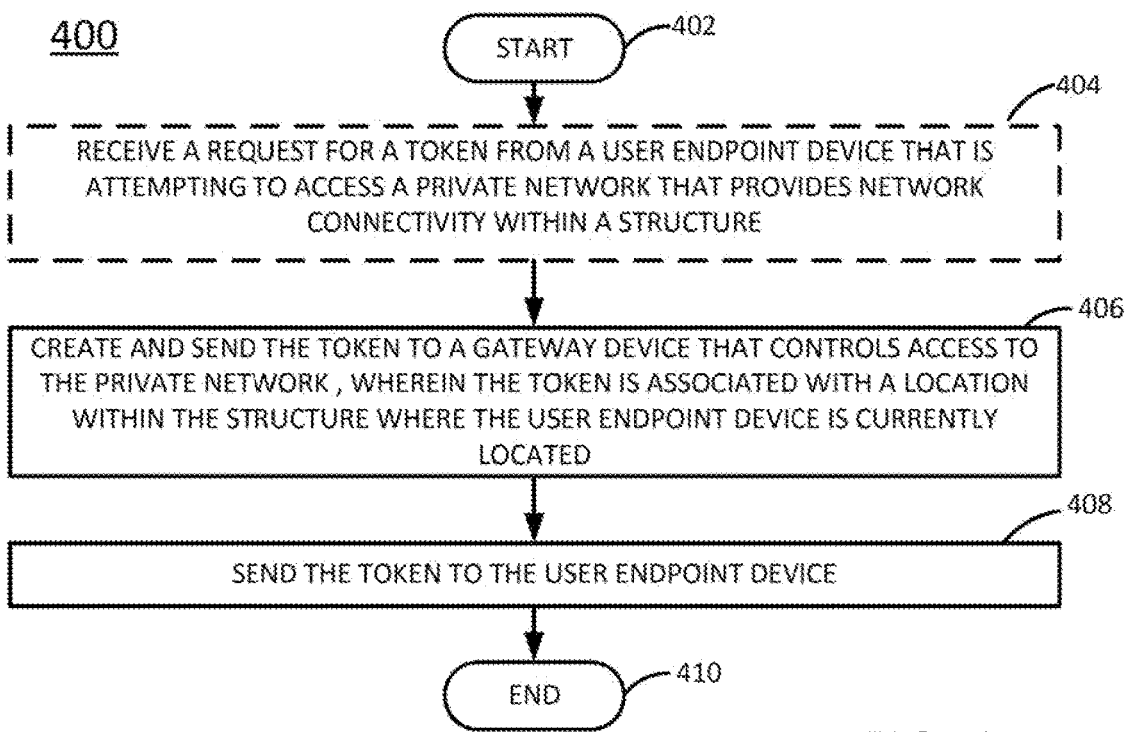
FIG. 4 illustrates a flowchart of an example method for managing access control in a private network based on the room in which a network-connected device is located.

FIG. 4 illustrates a flowchart of an example method 400 for managing access control in a private network based on the room in which a network-connected device is located. In one example, the method 400 may be performed by a beacon, such as one of the beacons 126 illustrated in FIG. 1. However, in other examples, the method 400 may be performed by another device, such as the computing system 500 of FIG. 5, discussed in further detail below. For the sake of discussion, the method 400 is described below as being performed by a processing system (where the processing system may comprise a component of a beacon, the computing system 500, or another device).

The method 400 begins in step 402. In optional step 404 (illustrated in phantom), the processing system may receive a request for a token from a user endpoint device that is trying to access a private network that provides network connectivity within a structure.

For instance, as discussed above, the structure may comprise a home, a school, an office building, a hospital, or another structure that includes a plurality of discrete locations (e.g., rooms or other defined spaces). The processing system may be part of a beacon whose position is fixed in one of these discrete locations. The user endpoint device may comprise any type of computing device that is capable of accessing resources and services over a network, such as a smartphone, a tablet computer, a laptop computer, a desktop computer, a wearable device, an IoT device, a gaming console, or the like. The position of the user endpoint device may also be fixed in one of the discrete locations, or the user endpoint device may be capable of moving among the discrete locations.

In step 406, the processing system may create and send the token to a gateway device that controls access to the private network, wherein the token is associated with the location within the structure where the user endpoint device is currently located.

In one example, the processing system may generate the token (e.g., a large random number) in response to the request received in step 404. In another example, rather than a token, the processing system may generate an encryption key in response to the request. In another example, the token may not be generated specifically in response to the request.

For instance, the processing system may periodically (e.g., every y seconds) generate a token, regardless of whether a request for a token has been received. The token (or the encryption key) may then be sent to the gateway device in a secure manner, for example using SSL or TLS.

The gateway device may be a router, a residential gateway, or another device that controls access to the private network by user endpoint devices. For instance, the gateway device may apply an access control rule to the identifier of the user endpoint device and the location within the structure (and, optionally, to the current time of day and to any specific resource or service that the user endpoint device is attempting to access via the private network) in order to determine whether the user endpoint device should be permitted to access the private network or be blocked from accessing the private network.

In step 408, the processing system may send the token to the user endpoint device.

The token (or the encryption key) may be sent to the gateway device in a secure manner, for example using SSL or TLS. Subsequently, the user endpoint device may provide the token to the gateway device, which may utilize the location associated with the token (as well as an identifier of the user endpoint device, and a time of day and/or resource or service the user endpoint device is attempting to access via the private network) to evaluate against an access control rule. The gateway device may grant or deny to the user endpoint device access to the private network based on an evaluation of the access control rule.

In step 410, the method 400 may end.

Although not expressly specified above, one or more steps of the method 200, 300, or 400 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIGS. 2, 3, and 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

Thus, examples of the present disclosure provide network access control at a more granular level. For instance, in one example, network access control rules may be defined for individual rooms or locations within a structure (e.g., a home, a school, or an office building) that is served by a private network, thereby allowing more finely tuned control over the manner in which devices access the private network. For instance, parents may prevent any devices from accessing the home network from their child's bedroom after 9:00 PM, or a person who works from home may prevent any devices from accessing work-related material over the home network from rooms in his or her home other than the home office. In one example, a local router such as a residential gateway may identify the room or location within a structure from which a device is attempting to connect to a private network that serves the structure. The local router may then manage network traffic to and from the device based on one or more traffic control rules that use features such as: (1) the room or location within the structure; (2) the device; and/or (3) the time of day.

Although examples of the present disclosure are discussed herein within the context of controlling access to a home network, it is noted that the same principles can be applied to control access to any private network that provides network connectivity within a structure having multiple discrete locations (e.g., rooms, cubicles, or other spaces). For instance, in addition to home, the examples disclosed herein could be implemented in an office building or campus, a school building or campus, a hospital, a public building such as a museum, a restaurant, a library, or a transportation hub, or the like. Moreover, the examples disclosed herein can be used to flexibility create and enforce a variety of access rules based on user needs.

For instance, in one example, the principles of the present disclosure could be used to prevent children from accessing the Internet from their bedroom after their bed time. In another example, the principles of the present disclosure could be used to restrict access to social networking web sites from a teenager's bedroom.

In another example, the principles of the present disclosure could be used in a school to ensure that, during school hours, students are only able to access the school's web site and no other web sites. This example could be extended to remote learning to ensure that even students who are participating in school from home cannot access other web sites during school hours.

In another example, the principles of the present disclosure could be used to restrict access to work related materials for individuals who work remotely. For instance, an individual who works from home may only be able to access work related materials from inside his or her home office (or another space in the home that is reserved for work).

In another example, the principles of the present disclosure could be used to ensure that individuals residing in neighboring spaces or structures (e.g., neighbors in a residential setting, employees of other businesses in a multi-tenant office building, etc.) cannot access a private network and consume bandwidth. For instance, by adding room-level restrictions on access (on top of or in addition to password protection), individuals in the neighboring spaces or structures may be blocked from accessing the private network.

In another example, the principles of the present disclosure could be used in a school to ensure that, during class time, students cannot access the Internet and become distracted by online activities when they are meant to be paying attention to their teacher.

In another example, the principles of the present disclosure could be used to control network access by Internet of Things (IoT) devices. For instance, an IoT device may move within a house or other structures and may use a camera to navigate. By blocking the IoT device's access to the house's home network from specific rooms, one can ensure that the IoT device cannot capture and/or transmit images and audio from those rooms.

Further examples of the present disclosure provide a means of temporarily overriding access control rules when an authorized device is present in the same location as a user endpoint device that is requesting network access. For instance, an access control rule may prevent children from accessing the Internet from their bedrooms after 9:00 PM, with the exception that Internet access may be granted in their bedrooms after 9:00 PM if at least one of their parents is also present in the bedrooms. To automate this exception, the same beacons used to detect the present of the child's user endpoint devices in his or her bedroom may be used to determine whether the parent's user endpoint device (e.g., a mobile phone) is also in the child's bedroom. On detecting the presence of the parent's user endpoint device, a beacon may send a token to the parent's user endpoint device. The parent's user endpoint device may, in turn, periodically send the token to the gateway device, and the gateway device will allow the exception as long as the gateway device continues to receive the token from the parent's user endpoint device.

FIG. 5 depicts a high-level block diagram of a computing device specifically programmed to perform the functions described herein. For example, any one or more components or devices illustrated in FIG. 1 or described in connection with the methods 200, 300, and 400 may be implemented as the system 500. For instance, the residential gateway 108 of FIG. 1 (such as might be used to perform the method 200) could be implemented as illustrated in FIG. 5. In another example, one of the beacons 126 of FIG. 1 (such as might be used to perform the method 300 or the method 400) could be implemented as illustrated in FIG. 5. In another example, any of the user endpoint devices of FIG. 1 could be implemented as illustrated in FIG. 5.

As depicted in FIG. 5, the system 500 comprises a hardware processor element 502, a memory 504, a module 505 for managing access control in a private network based on the room in which a network-connected device is located, and various input/output (I/O) devices 506.

The hardware processor 502 may comprise, for example, a microprocessor, a central processing unit (CPU), or the like. The memory 504 may comprise, for example, random access memory (RAM), read only memory (ROM), a disk drive, an optical drive, a magnetic drive, and/or a Universal Serial Bus (USB) drive. The module 505 for managing access control in a private network based on the room in which a network-connected device is located may include circuitry and/or logic for performing special purpose functions relating to locally managing quality of experience in a home network. The input/output devices 506 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the general-purpose computer may employ a plurality of processor elements. Furthermore, although only one specific-purpose computer is shown in the Figure, if the method(s) as discussed above is implemented in a distributed or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s)

discussed above can be used to configure a hardware processor to perform the steps, functions and/or operations of the above disclosed method(s). In one example, instructions and data for the present module or process 505 for managing access control in a private network based on the room in which a network-connected device is located (e.g., a software program comprising computer-executable instructions) can be loaded into memory 504 and executed by hardware processor element 502 to implement the steps, functions or operations as discussed above in connection with the example methods 200, 300, and 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for managing access control in a private network based on the room in which a network-connected device is located (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
    receiving, by a processing system including at least one processor, a request from a user endpoint device to access a private network that provides a network connectivity within a structure, wherein the processing system is part of a gateway device that manages network traffic within the private network, and the request is received directly by the gateway device from the user endpoint device;
    determining, by the processing system, a current location of the user endpoint device within the structure, wherein the determining the current location of the user endpoint device within the structure comprises:
        receiving, by the processing system separately from the request, a message from a beacon having a fixed location within the structure, wherein the beacon is separate from the gateway device, and wherein the fixed location is deemed to be the current location of the user endpoint device when the message from the beacon includes an identifier of the user endpoint device and further includes, together with the identifier of the user endpoint device, an identifier that identifies the beacon;
    determining, by the processing system, whether an access control rule permits access to the private network for a combination of the user endpoint device and the current location of the user endpoint device; and
    taking, by the processing system in response to the determining, an action to enforce the access control rule.

2. The method of claim 1, wherein the gateway device is a residential gateway, and the private network is a home network.

3. The method of claim 2, wherein the structure is a home, and the current location is a specific room of a plurality of rooms within the home.

4. The method of claim 1, wherein the gateway device further comprises a router, and the private network is an enterprise network.

5. The method of claim 4, wherein the structure is an office building, and the current location is a specific room of a plurality of rooms within the office building.

6. The method of claim 1, wherein the gateway device further comprises a router, and the private network is a school network.

7. The method of claim 6, wherein the structure is a school building, and the current location is a specific room of a plurality of rooms within the school building.

8. The method of claim 1, wherein the message further comprises at least one of: a time at which the request was made and a resource or a service that the user endpoint device is attempting to access via the private network.

9. The method of claim 8, wherein the combination further includes the time at which the request was made and the resource or the service that the user endpoint device is attempting to access via the private network.

10. The method of claim 1, wherein the beacon is a last beacon of a plurality of beacons distributed throughout the structure from which the processing system received a message that included the identifier of the user endpoint device.

11. The method of claim 1, wherein the taking the action comprises:
    allowing, by the processing system, the user endpoint device to access the private network when the determining concludes that the access control rule permits access to the private network for the combination.

12. The method of claim 11, wherein the allowing is further based on the processing system verifying a presence of another user endpoint device in the current location.

13. The method of claim 1, wherein the taking the action comprises:
    denying, by the processing system, the user endpoint device access to the private network when the determining concludes that the access control rule does not permit access to the private network for the combination.

14. A non-transitory computer-readable medium storing instructions which, when executed by a processing system including at least one processor, cause the processing system to perform operations, the operations comprising:
    receiving a request from a user endpoint device to access a private network that provides a network connectivity within a structure, wherein the processing system is part of a gateway device that manages network traffic within the private network, and the request is received directly by the gateway device from the user endpoint device;
    determining a current location of the user endpoint device within the structure, wherein the determining the current location of the user endpoint device within the structure comprises:
        receiving, separately from the request, a message from a beacon having a fixed location within the structure, wherein the beacon is separate from the gateway device, and wherein the fixed location is deemed to be the current location of the user endpoint device, wherein the message from the beacon includes an identifier of the user endpoint device and further includes, together with the identifier of the user endpoint device, an identifier that identifies the beacon;

determining whether an access control rule permits access to the private network for a combination of the user endpoint device and the current location of the user endpoint device; and taking, in response to the determining, an action to enforce the access control rule.

15. A system comprising:

a processing system including at least one processor; and a non-transitory computer-readable medium storing instructions which, when executed by the processing system, cause the processing system to perform operations, the operations comprising:

receiving a request from a user endpoint device to access a private network that provides a network connectivity within a structure, wherein the processing system is part of a gateway device that manages network traffic within the private network, and the request is received directly by the gateway device from the user endpoint device;

determining a current location of the user endpoint device within the structure, wherein the determining the current location of the user endpoint device within the structure comprises:

receiving, separately from the request, a message from a beacon having a fixed location within the structure, wherein the beacon is separate from the gateway device, and wherein the fixed location is deemed to be the current location of the user endpoint device, wherein the message from the beacon includes an identifier of the user endpoint device and further includes, together with the identifier of the user endpoint device, an identifier that identifies the beacon;

determining whether an access control rule permits access to the private network for a combination of the user endpoint device and the current location of the user endpoint device; and taking, in response to the determining, an action to enforce the access control rule.

16. The method of claim 1, wherein the beacon comprises:

a first, short-range transmitter for communicating with the user endpoint device when the user endpoint device is located within range of the first, short-range transmitter; and a second transmitter having a longer range than the first, short-range transmitter, for communicating with the gateway device.

17. The method of claim 16, wherein the first, short range transmitter functions to ensure that the beacon can only be accessed by user endpoint devices located in the fixed location.

18. The method of claim 1, wherein the beacon uniquely identifies the fixed location within the structure.

19. The method of claim 18, wherein the gateway device stores a data structures that indicates the fixed location of the beacon.

20. The method of claim 1, wherein the beacon attempts to connect to the user endpoint device to confirm a continued presence of the user endpoint device in the fixed location.

* * * * *